US009106498B2

(12) United States Patent
Liu et al.

(10) Patent No.: US 9,106,498 B2
(45) Date of Patent: Aug. 11, 2015

(54) METHOD FOR SYMBOL SYNCHRONIZATION OF RECEIVED DIGITAL SIGNAL AND DIGITAL SIGNAL RECEIVER USING THE SAME METHOD

(75) Inventors: Gang Liu, Beijing (CN); Li Zou, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 936 days.

(21) Appl. No.: 12/448,885

(22) PCT Filed: Jan. 18, 2007

(86) PCT No.: PCT/CN2007/000183
§ 371 (c)(1),
(2), (4) Date: Jul. 13, 2009

(87) PCT Pub. No.: WO2008/089592
PCT Pub. Date: Jul. 31, 2008

(65) Prior Publication Data
US 2010/0061478 A1     Mar. 11, 2010

(51) Int. Cl.
*H04L 7/00* (2006.01)
*H04L 27/26* (2006.01)

(52) U.S. Cl.
CPC ........ *H04L 27/2662* (2013.01); *H04L 27/2678* (2013.01); *H04L 27/2688* (2013.01)

(58) Field of Classification Search
None
See application file for complete search history.

(56) References Cited

U.S. PATENT DOCUMENTS

| | | | |
|---|---|---|---|
| 5,692,008 A | | 11/1997 | Van Nee |
| 5,761,211 A | * | 6/1998 | Yamaguchi et al. ........... 714/707 |
| 6,031,882 A | * | 2/2000 | Enge et al. .................... 375/343 |
| 6,647,025 B1 | | 11/2003 | Sudo |
| 7,453,961 B1 | * | 11/2008 | Li et al. ......................... 375/343 |
| 2001/0010703 A1 | | 8/2001 | Ohsuge |
| 2004/0105418 A1 | | 6/2004 | Hirade |
| 2005/0100109 A1 | | 5/2005 | Nagata et al. |
| 2005/0105659 A1 | | 5/2005 | Sheu et al. |
| 2005/0265219 A1 | | 12/2005 | Murphy et al. |

(Continued)

FOREIGN PATENT DOCUMENTS

| | | |
|---|---|---|
| EP | 1005204 | 5/2000 |
| JP | 2000224132 | 8/2000 |
| JP | 2001217747 | 8/2001 |
| JP | 2004236266 A  * | 8/2004 |

(Continued)

OTHER PUBLICATIONS

Search Report Dated Oct. 17, 2007.

(Continued)

*Primary Examiner* — Shuwang Liu
*Assistant Examiner* — Gina McKie
(74) *Attorney, Agent, or Firm* — Myers Wolin LLC (57) ABSTRACT

A method for symbol synchronization of received digital signal and a digital signal reception apparatus are provided. The method comprises steps of correlating the received digital signal with the received signal delayed by one symbol so as to obtain a first correlation value result as a combined effort of a strongest path and other paths; removing substantially effect of the strongest path from the first correlation result so as to obtain a second correlation result which exhibits contribution of a fastest path; searching a maximum correlation value and its position of the fastest path so as to determine symbol synchronization timing for initiating FFT processing. The digital signal reception apparatus is characterized by a symbol timing detecting unit for determining symbol synchronization timing of the fastest path through substantially removing the effect of a strongest path.

6 Claims, 6 Drawing Sheets

(56) References Cited

U.S. PATENT DOCUMENTS

| | | | |
|---|---|---|---|
| 2005/0287956 A1 | 12/2005 | Golden et al. | |
| 2006/0140109 A1 | 6/2006 | Lin | |
| 2006/0140392 A1 | 6/2006 | Ahmadi | |
| 2006/0262715 A1 | 11/2006 | Taniguchi | |
| 2015/0011207 A1* | 1/2015 | Pu | 455/434 |
| 2015/0062439 A1* | 3/2015 | Wu et al. | 348/731 |

FOREIGN PATENT DOCUMENTS

| | | |
|---|---|---|
| JP | 2006020190 | 1/2006 |
| JP | 2006108764 | 4/2006 |
| JP | 3869374 | 1/2007 |
| WO | WO 02/087101 | 10/2002 |
| WO | WO02087101 | 10/2002 |
| WO | WO 2004/012452 | 2/2004 |
| WO | WO2004012452 | 2/2004 |

OTHER PUBLICATIONS

Sourour et al; "Delay tracking for direct sequence spread spectrum systems in multipath fading channels"; Vehicular Technology Conference, 1999 IEEE 49th Houston, TX, vol. 1, May 16, 1999, pp. 422-426.

Nandula, S. et al., "Robust Timing Synchronization for OFDM Based Wireless LAN System", 2003 Conference on Convergent Technologies for the Asia-Pacific Region, vol. 4, Oct. 15, 2003, pp. 1558-1561.

Sheu, Chorng-Ren et al., "A Novel Guard Interval Based ISI-Free Sampling Region Detection Method for OFDM Systems", 2004 IEEE 60th Vehicular Technology Conference, vol. 1, Sep. 26, 2004, pp. 515-519.

Gertou, M. et al., "Synchronization Approach for OFDM based Fixed Broadband Wireless Access Systems", 2001 1st Communications Mobile Summit, Barcelona, Spain, Sep. 9, 2001, pp. 1-6.

Helard, J.-F., "Time synchronisation without specific symbols for OFDM", Electronics Letters, vol. 35, No. 2, Jan. 21, 1999, pp. 130-132.

Palin, Arto et al., "Enhanced Symbol Synchronization Method for OFDM System in SFN Channels", 1998 IEEE Global Telecommunications Conference, vol. 5, Sydney, New South Wales, Nov. 8, 1998, pp. 2788-2793.

* cited by examiner

METHOD FOR SYMBOL SYNCHRONIZATION OF RECEIVED DIGITAL SIGNAL AND DIGITAL SIGNAL RECEIVER USING THE SAME METHOD

This application claims the benefit, under 35 U.S.C. §365 of International Application PCT/CN2007/000183, filed Jan. 18, 2007, which was published in accordance with PCT Article 21(2) on Jul. 31, 2008 in English.

FIELD OF THE INVENTION

The present invention relates to digital signal receiving technology, and more particularly to a method for symbol synchronization of received digital signal and a digital signal receiving apparatus using the same method.

BACKGROUND OF THE INVENTION

Synchronization is one crucial subject for digital signal receiving system, which includes symbol timing, frequency synchronization and sample clock synchronization in OFDM system. For the symbol timing which determines the Fast Fourier Transform (FFT) placement location, the proper selection of this location has a major performance impact on all post FFT algorithms. Therefore, it is desirable to achieve good timing early in the acquisition.

Figure 1:
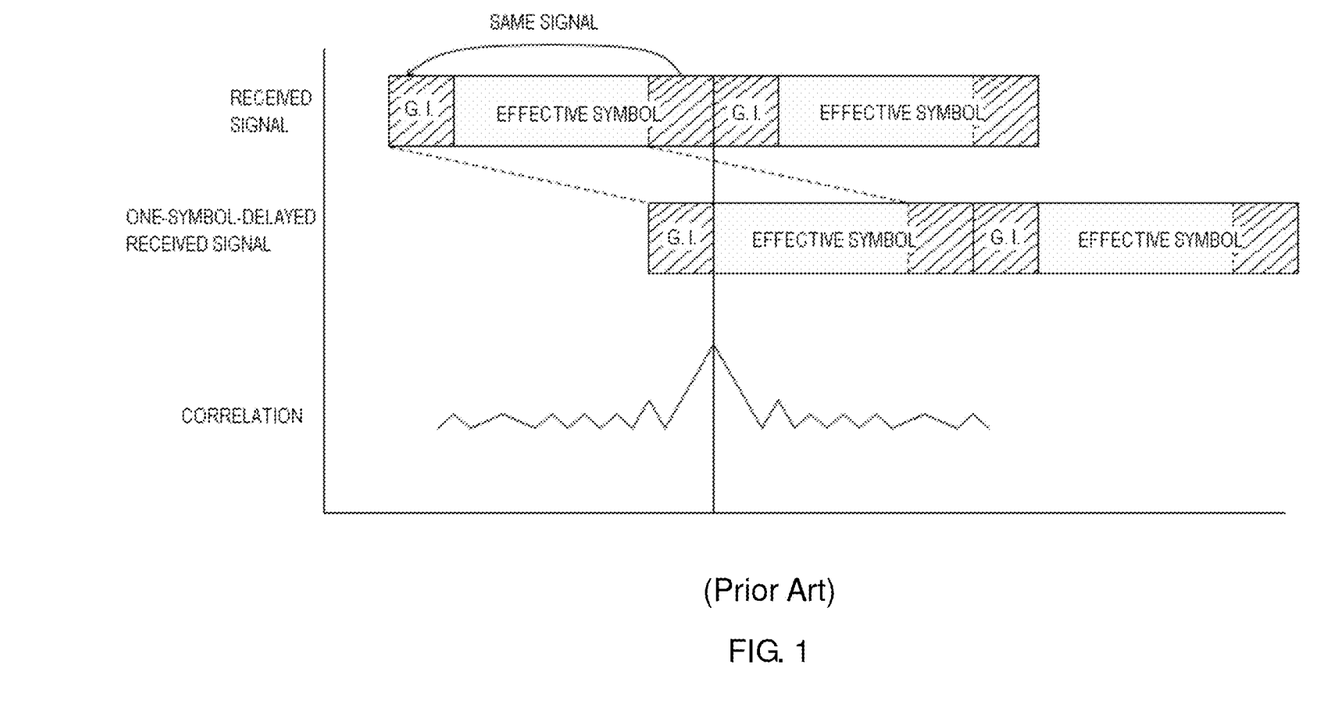
FIG. 1 is a schematic diagram illustrating a correlation value calculation result in a digital signal reception apparatus.

In some current systems, e.g. the Orthogonal Frequency Division Multiplexing (OFDM) system, the received signal generally has frame structure as illustrated in FIG. 1, wherein effective symbols are separated by guard intervals (GI) each of which is a copy of an end portion of the effective symbol. Since there is no pilot can be used before the fast Fourier transform (FFT), the symbol timing will be estimated by the cyclic guard intervals.

Conventionally, the symbol timing determination is to calculate the correlation value of the received signal with the received signal delayed by one symbol, detect the peak of the correlation value, and obtain the timing, which is used as the indication for FFT processing initiation for the received signal.

The conventional estimation algorithm is to search maximum correlation peak, which is corresponding to timing position. The basic principle of these algorithms is shift autocorrelation. Since the cyclic prefix i.e. the guard interval is a copy of an end portion of the effective symbol, their correlation has a big correlation peak value. A conventional method of searching the correlation peak can be represented in the following equation:

$$n_\varepsilon = \operatorname{argmax}(\Lambda_r(n_r)) \quad (1)$$

$$\Lambda_r(n_r) = \left| \sum_{n=n_r}^{n_r+N_g-1} (r_{l,n} \cdot r_{l,n+N}) \right|$$

Where, is $r_{l,n}$ is $n^{th}$ received sample of $l^{th}$ symbol, $r_{l,n+N}$ is its N samples delay, $n_r$ is starting position of searching, $N_g$ is guard interval length, nε is estimated symbol timing position, and $\Lambda_r(n_r)$ is likelihood function of received signal at the time $n_r$.

This method is valid under AWGN, ETSI-Rayleigh/Ricean, ETSI-Ricean and some moderately dispersive channel. But in long path channel such as Single Frequency Network (SFN) channel, especially two-path channel whose first arrived path is not the strongest one and the strongest path is far away from the first path, even its channel delay over a guard interval, the conventional estimation algorithm gives a little effort. It only estimates position of average peak or maximum peak, as the result, symbol timing error of the receiver is very big. If the conventional method is used, the first path will be ignored, and Inter-Symbol Interference (ISI) will be generated. Therefore, it is desirable to search the first path in order to avoid ISI and make channel estimation module "see" all Channel Impulse Response (CIR).

There are many studies focus on how to detect the fastest timing in order to achieve good timing as earlier as possible. The synchronization in strong SFN channel can be achieved by using a double correlation method which will find the middle point of the impulse response of channel. As the result, the first useful path is still discarded. If the distance of two path reaches guard interval or even larger, the error will be larger. Moreover the double correlation method needs more memory resource than the single correlation.

Figure 2:
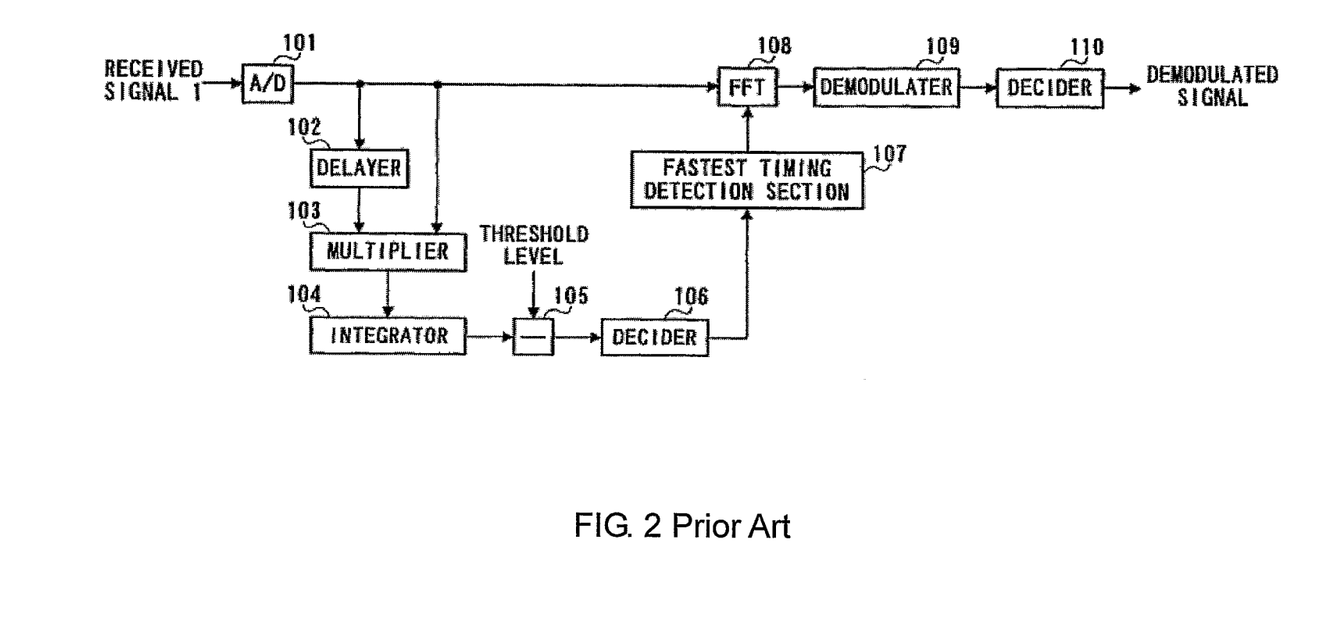
FIG. 2 is schematic block diagram illustrating a part of configuration of a conventional digital signal reception apparatus.
Figure 3:
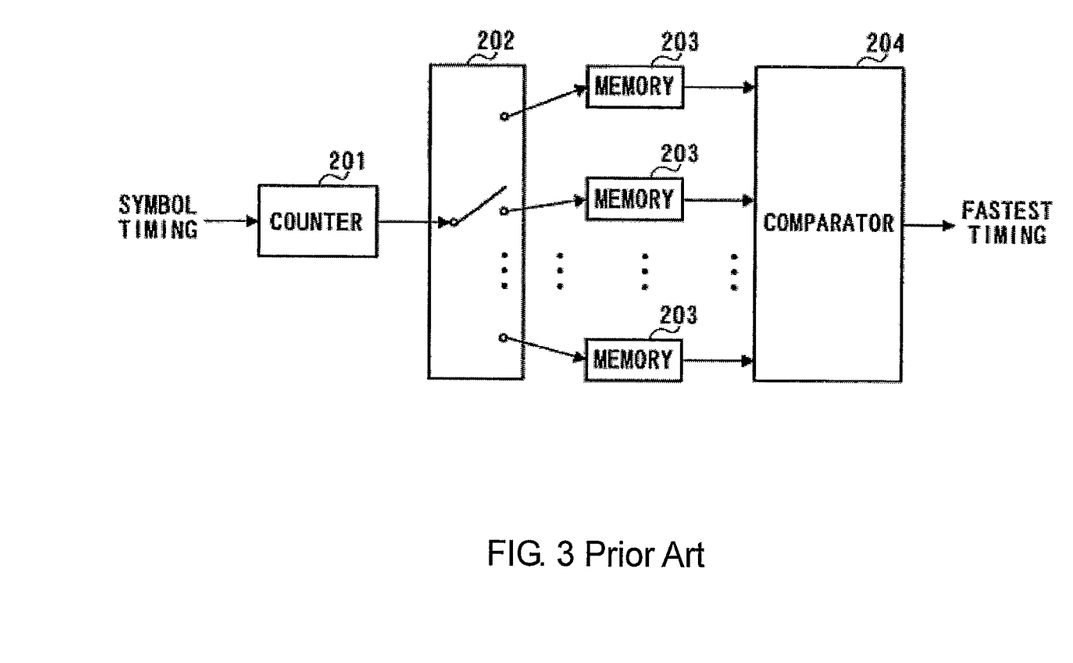
FIG. 3 is a schematic block diagram illustrating a part of configuration of a fastest timing detection section in the conventional digital signal reception apparatus as shown in FIG. 2.

EP patent application EP1005204 discloses a symbol synchronization error reduction method aiming to solve the above mentioned problem by selecting a fastest timing among timings detected in a timing detection step during a predetermined time. With reference to FIGS. 2 and 3, in one embodiment of this invention, a digital signal reception apparatus with a fastest timing detection section is provided. FIG. 2 shows a part of the configuration of the digital signal reception apparatus, wherein the received signal is converted into the digital signal in A/D converter 101, and then delayed by one symbol in delayer 102, a multiplier 103 calculates the correlation value of the received signal with the one-symbol-delayed received signal, an integrator 104 integrates the calculated correlation value, a subtracter 105 and a decider 106 executes a decision to detect the peak of the correlation value for each frame of the received signal. With respect to the peaks of the correlation values output from the decider 106, a fastest timing detection section 107 compares the peaks for each of a plurality of received frames and output the fastest symbol synchronization timing as the FFT processing initiating timing. FIG. 3 shows a part of conventional configuration of the fastest timing detection section 107, wherein a counter 201 suspends counting operation at the peak detected timing for each frame of the received signal, a switch 202 switches the counted numerical value for each frame to output to respective memory 203, and a comparator calculates the stored numerical value and output the least numerical value as the fastest symbol synchronization timing.

As described above, this invention aims to provide a digital signal reception apparatus which improves the accuracy for the symbol synchronization acquisition and reduces the error possibility under multipath environment. However, it's still methodologically complicated, so that the memory resource needs for the computation is high.

Therefore, it is desirable to develop an improved method for symbol synchronization of the digital signal reception, which overcomes drawbacks of the prior arts.

SUMMARY OF THE INVENTION

The present invention provides an improved symbol synchronization method for digital signal reception and a digital signal reception apparatus using this method.

According to one aspect of the present invention, a method for symbol synchronization of received digital signal in a multi-path environment is provided, wherein the method comprises steps of correlating the received digital signal with the received signal delayed by one symbol so as to obtain a first correlation result as a combined effort of a strongest path and other paths; searching a maximum correlation value and its position of the first correlation result; characterized by removing substantially effect of the strongest path from the first correlation result of the preceding step so as to obtain a second correlation result which exhibits contribution of a fastest path; searching a maximum correlation value and its position corresponding to the fastest path contribution after the removing step; determining symbol synchronization timing of the detected fastest path through repeating of preceding steps.

According to another aspect of the present invention, a digital signal reception apparatus for receiving digital signal in a multi-path environment, including a correlation unit for correlating the received digital signal with the received signal delayed by one symbol, in that it comprises a symbol timing detecting unit, which determines symbol synchronization timing of a fastest path through substantially removing the effect of a strongest path, and a Fourier transform unit for performing Fourier transform processing on the received signal using the determined symbol synchronization timing of the fastest path. Wherein the symbol timing detecting unit comprises a first comparator for searching a maximum correlation value and its position; a subtracter for removing substantially effect of the strongest path; and a second comparator for searching a maximum correlation value and its position after the effect of the strongest path is removed, so as to determine the symbol synchronization timing of the fastest path.

Since the strongest path affection is removed, the fastest path can be detected efficiently in a simple algorithm, advantageously, the timing of the fastest path is used in the symbol synchronization under the multi-path environment, therefore the symbol timing error of the receiver is reduced, and Inter-Symbol Interference (ISI) will be avoided.

DETAIL DESCRIPTION OF PREFERRED EMBODIMENTS

The present invention provides an improved symbol synchronization method for digital signal reception and a digital signal reception apparatus using this method. The gist of the invention is to use the fastest symbol synchronization timing for initiation of processing the FFT, characterized by the way of removing the effect of the strongest path. Embodiments of the present invention will now be described with reference to accompanying drawings.

Figure 4:
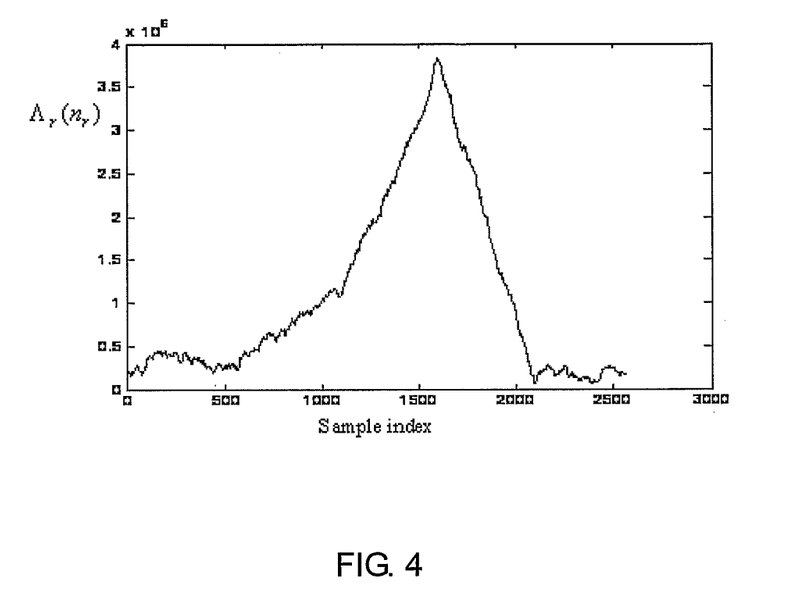
FIG. 4 is an exemplary diagram illustrating a correlation result obtained in a two-path environment.

Considering one channel model which comprises two paths and the first arrived path may not be the strongest one, the main idea of the invention is to remove the effect of the strongest path, and use a threshold as an estimation standard. With reference to FIG. 4, an exemplary diagram of correlation value of the received signal and the received signal delayed by one symbol based on DVB-T system frame structure (2 k mode) is shown. Where, channel delay is [0 60] us, relative channel power is [−5 0] dB, Maximum Doppler frequency is 50 Hz. In FIG. 4, there are two main peaks, a first one is from −5 dB path, and a second one is from 0 dB path. It is difficult to distinguish the distance of the two correlation peaks from this profile. The first peak corresponding to the fastest path, i.e. the first arrived path, is submerged into the rising period of the maximum peak, which is the contribution of both the first arrived path and the second strongest path. Therefore, the position of the first peak can be determined by removing the effect of the maximum peak to the first peak.

Figure 5:
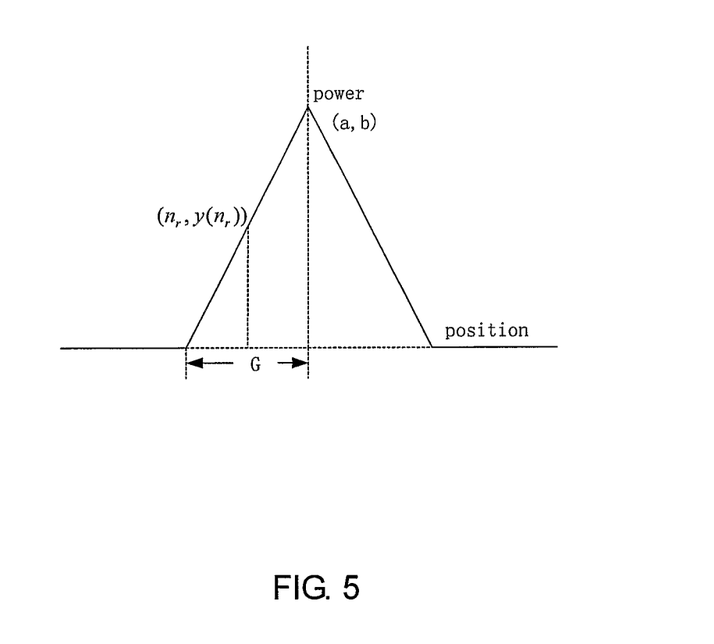
FIG. 5 is a simplified diagram of the correlation result of FIG. 4, illustrating the theory of calculating the correlation with the effect of the strongest path removed.

According to the invention, the affection of the maximum peak to the first peak can be estimated in a way similar to linear variety. The correlation result is just like a triangle curve, and the top of the triangle curve is the correlation peak, i.e. the maximum correlation value, which is regarded as the contribution of the strongest path or common contribution of all paths. FIG. 5 is a simplified diagram of the correlation of FIG. 4, illustrating the calculation theory, where x axis is the searching position index, and y label is the corresponding maximum correlation value; a is supposed to be the position of the second path, i.e. the strongest path, and b is the corresponding maximum correlation value of the strongest path, G is the distribution length of the strongest path, and in general, it is the length of the guard interval. Now we have the following result:

$$y(n_r) = \begin{cases} \dfrac{G-(a-n_r)}{G} \cdot b, & a-G < n_r < a \\ 0, & \text{others} \end{cases} \quad (2)$$

Since only the position before the maximum peak is considered, $n_r$ must be lower than a. Then the correlation value for the first arrived path can be calculated by removing the effort of the strongest arrived path:

$$\Lambda_r'(n_r) = \Lambda_r(n_r) - y(n_r). \quad (3)$$

Where, $\Lambda_r'(n_r)$ is estimated correlation value resulted from the first arrived path, and $\Lambda_r(n_r)$ is correlation value resulted from the first arrived path and the strongest path.

Next step is to search the maximum correlation value after the effect of the strongest path is removed, if the detected $\Lambda_r'(n_r(\max))$ is over a predefined threshold, the position of the first path is successfully determined as the fastest symbol synchronization timing.

It should be noted that the maximum peak which can be watched on the correlation result of equation 1, as referred in FIG. 4 is a common contribution of the two paths, specially when the two paths are very near to the each other, that is to say, the maximum value M is effort of two paths, b is equal or lower than the maximum correlation value M. Therefore, b equals to a right value of maximum correlation value M, i.e. $b = \mu \ast M$, where M is the maximum correlation value, the ratio $\mu$ is a value being equal or lower than 1, and its initial value is 1. If the first path is not estimated successfully, the ratio value μ decreases a little, i.e. $\mu_{next} = \mu_{current} - w$, where w is a constant, e.g. w=0.05. However, the ratio value will not be decreased without any limitation. If the ratio value reaches a predefined level, and the estimation is still not successful, the searching process will be stopped and the strongest path will be regarded as the first path.

Figure 6:
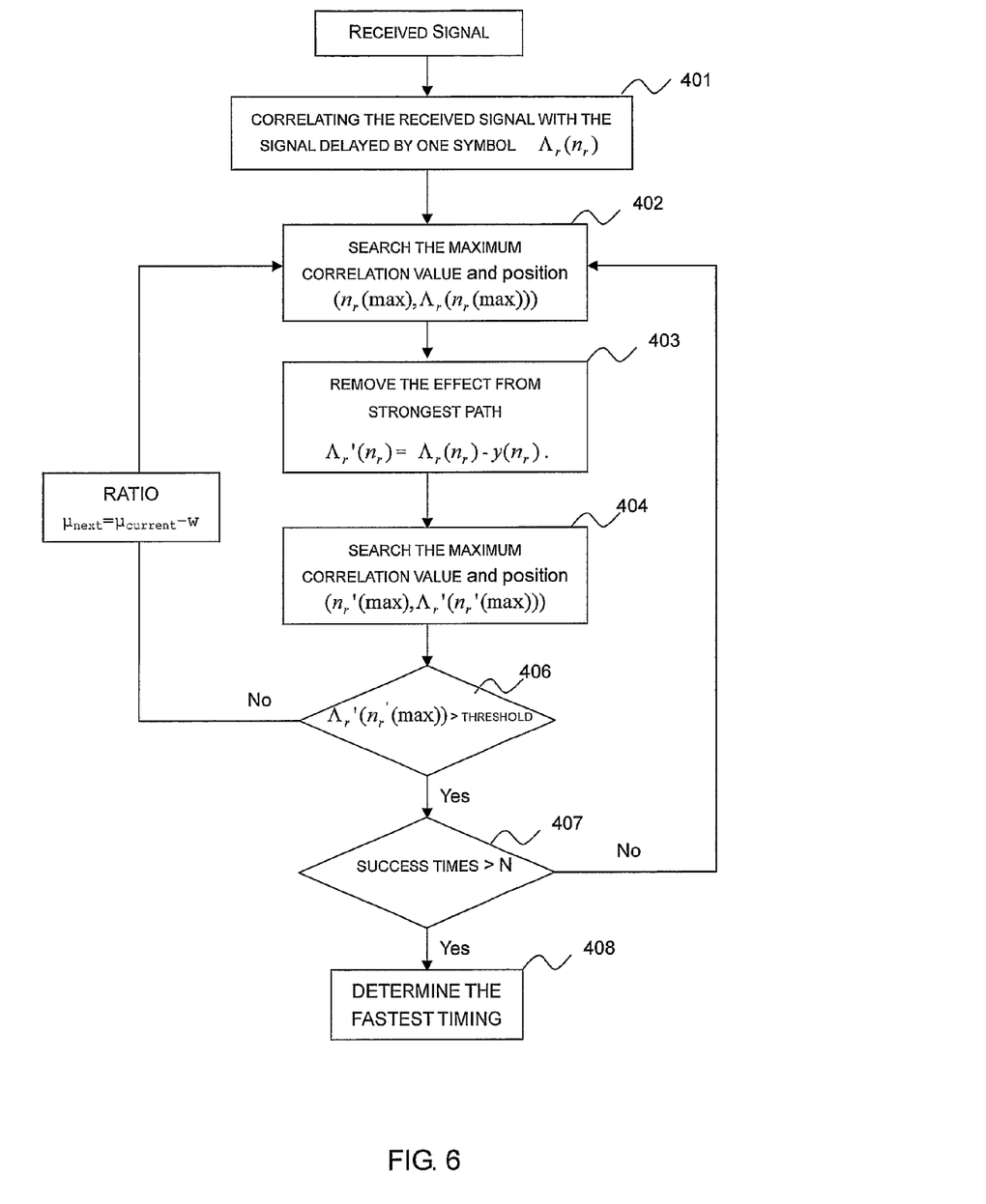
FIG. 6 is a flow diagram illustrating detailed processes of the symbol synchronization method in accordance with the present invention.

The main estimation procedures of the present invention are illustrated in accordance with FIG. 6. In Step 401, a first correlation result $\Lambda_r(n_r)$ for the received signal with the received signal delayed by one symbol is calculated first through the equation (1) as set forth foregoing. In Step 402, the maximum correlation peak is searched in any kind of conventional algorithm. Then in Step 403, a second correlation result for the first arrived path is calculated by removing the effect of strongest arrived path according to the equation (3):

$$\Lambda_r'(n_r) = \Lambda_r(n_r) - y(n_r)$$

Afterwards, in Step 404, the maximum correlation value without the effect of the strongest path is searched again, so as to find the peak value of $\Lambda_r'(n_r'(max))$ through one symbol duration, and record its position $n_r'(max)$ which corresponds to the fastest arrival path. In Step 405, the result of the search is compared with a predefined threshold to determine whether the detected result is reliable and valid, and determine the position of the peak corresponding to the fastest path. If the $\Lambda_r'(n_r'(max))$ is over the predefined threshold, then the estimated correlation value is successfully determined as it corresponds to a position of the fastest path, and the success time of the determination will add one. If the success times reach a preset value, the output of final determined position is the average result of all $n_r'(max)$ as in Step 407, hence the timing search procedure is accomplish, else go to Step 402. If the $\Lambda_r'(n_r'(max))$ is below the predefined threshold, that is to say that the search of Step 404 fails, then the ratio μ will be decreased, i.e. $\mu_{next} = \mu_{current} - w$, e.g. w=0.05, and then go back to Step 402.

Figure 7:
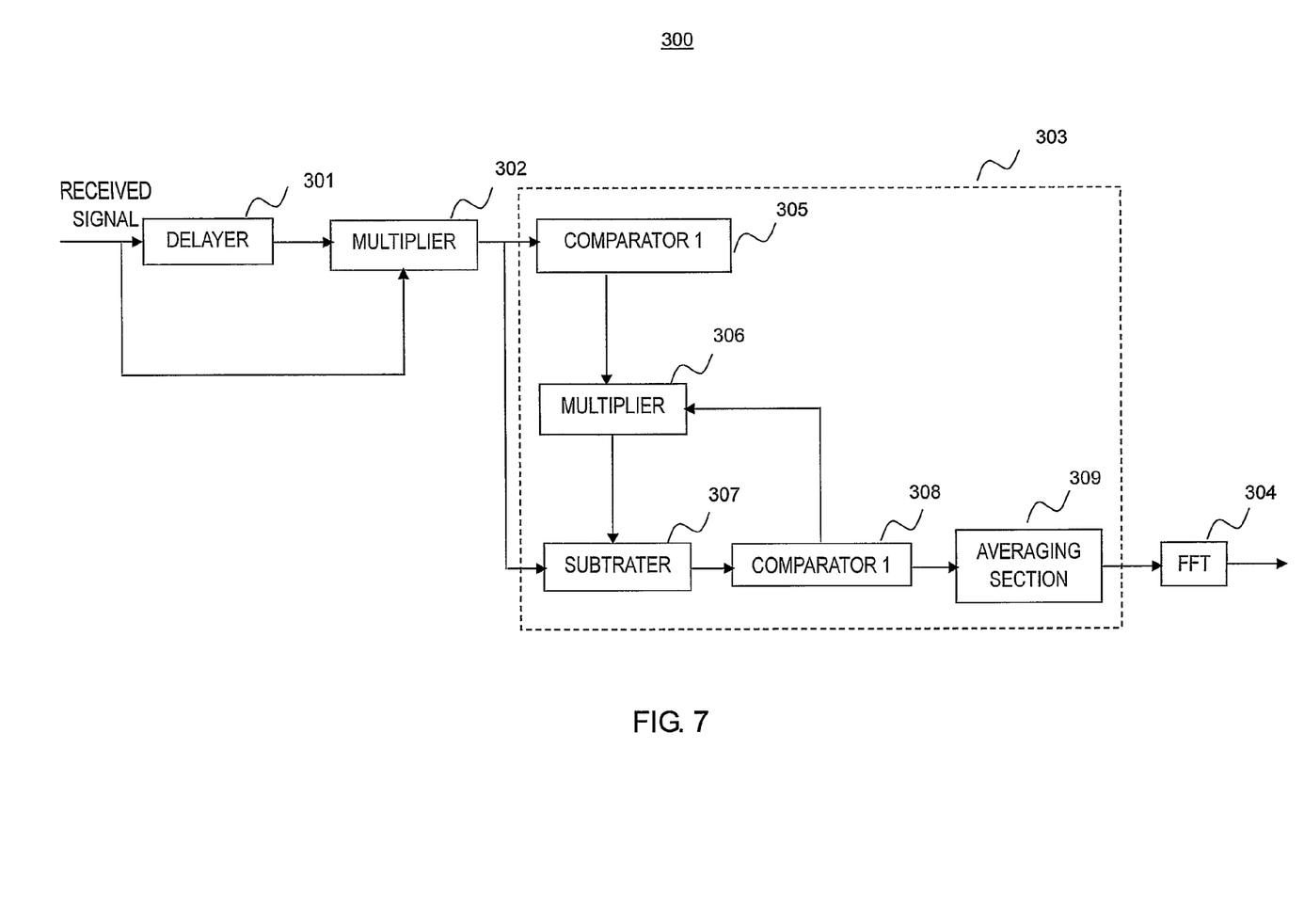
FIG. 7 is a schematic diagram illustrating a part of configuration of an embodiment of the digital signal reception apparatus in accordance with the present invention.

With reference to FIG. 7, a part of configuration of the digital signal reception apparatus 300 in accordance with the invention comprises a delayer 301, a first multiplier 302, a fastest timing detection unit 303 and a FFT unit 304, wherein the fastest timing detection unit 303 includes a first comparator 305, a second multiplier 306, a subtracter 307, a second comparator 308, and an averaging section 309. The delayer 301 delays the received signal by one symbol. The first multiplier 302 executes complex multiplication processing between the received signal and the received signal delayed by one symbol in the delayer 301 so as to output a first correlation value result for the received signal and the one-symbol-delayed received signal, with reference to FIG. 4. The fastest timing detection unit 303 performs estimation of the earliest arrived path in order to determine the fastest symbol timing for initiating FFT processing. In the fastest timing detection unit 303, the first comparator 305 executes a calculation to search the maximum peak by any possible conventional method and output the result. The second multiplier 306 is to recalculate the maximum correlation value of the strongest path in response to the estimation result of the second comparator 308. The subtracter 307 removes the effort of the strongest path to the first path. The second comparator 308 searches the maximum correlation value after removing the strongest path effect, and sends a flag to the second multiplier 306 in case the maximum correlation value is lower than a predefined threshold. Finally the output from the second comparator 308 will be averaged in the averaging section 309 and output to the FFT circuit 304.

The present invention is not limited to the above described embodiments, various variations and modifications may be possible without departing from the scope of the present invention.

The invention claimed is:

1. A method for a symbol synchronization of a received digital signal in a multi-path environment, comprising:
    correlating the received digital signal with a received signal delayed by one symbol so as to obtain a first correlation result as a combined effort of a strongest path;
    searching a maximum correlation value and its position of the first correlation result;
    removing a substantial effect of the strongest path from the first correlation result of the search so as to obtain a second correlation result which exhibits contribution of a fastest path, wherein, removing a substantial effect further comprises multiplying the maximum correlation value of the first correlation result by a ratio value as a correlation value of the strongest path;
    searching a maximum correlation value and its position corresponding to the fastest path contribution of the second correlation result after the removing the substantial effect by comparing an estimated correlation value with a predefined threshold, wherein searching the maximum correlation value and its position of the first correlation result further comprises
        when the estimated correlation value is larger than the predefined threshold, determining a position of the fastest path, or
        when the estimated correlation value is less than the predefined threshold, reducing the ratio value by a value and repeating the search of the maximum correlation value and its position of the first correlation result;
    determining a symbol synchronization timing of the detected fastest path through repeating the search of the maximum correlation value and its position of the first correlation result and the search of the maximum correlation value its position corresponding to the fastest path contribution of the second correlation result after the removing the substantial effect.

2. The method as claimed in claim 1, wherein if the ratio value reaches a predefined level, and the fastest path is not estimated, the searching of the maximum correlation value and its position stops and the strongest path is determined as the fastest path.

3. The method as claimed in claim 1, wherein a final determined symbol synchronization timing of the detected fastest path is an average.

4. A digital signal reception apparatus for receiving a digital signal in a multi-path environment, including a correlation unit for correlating the received digital signal with a received signal delayed by a symbol so as to obtain a first correlation result as a combined effort of a strongest path, the apparatus comprising:
    a first comparator for searching a maximum correlation value and its position of the first correlation result;
    a subtracter for removing a substantially effect of the strongest path so as to obtain a second correlation result, wherein the subtracter further comprises a calculation unit for multiplying, a correlation value of the strongest path equals to the maximum correlation value of the first correlation result multiplied by a ratio value as a correlation value of the strongest path; and
    a second comparator for searching a maximum correlation value and its position of the second correlation result after the substantial effect of the strongest path is removed so as to determine a symbol synchronization timing of the fastest path by comparing an estimated correlation value with a predefined threshold, wherein the second comparator further comprises a symbol timing detecting unit for, the maximum correlation value and its position of the second correlation result are searched by comparing estimated correlation value with a predefined threshold, detecting if an the estimated correlation value is larger than thea predefined threshold, when the estimated correlation value is larger than the predefined threshold then a symbol synchronization timing position of the fastest path is determined, else when the estimated correlation value is less than the predefined threshold, the calculation unit reduces the ratio value is reduced by a predetermined value and the substantial effect of the strongest path is removed from the first correlation result to obtain the second correlation result; and a Fourier transform unit for performing Fourier transform processing on the received signal using the determined symbol synchronization timing of the fastest path.

5. The digital signal reception apparatus as claimed in claim 4, wherein the symbol timing detecting unit further comprises an averaging component for calculating an average result of all the estimated position of the fastest path.

6. The digital signal reception apparatus as claimed in claim 4, wherein the symbol timing detecting unit further comprises a multiplier for recalculating the maximum correlation value of the strongest path in response to the estimation result of the fastest path.

\* \* \* \* \*